UNITED STATES PATENT OFFICE.

FREDERICK SHIRLEY KNAPPER, OF SPRINGFIELD, OHIO.

COMPOSITION OF MATTER FOR USE IN FOUNDRY PRACTICE.

1,288,035.  Specification of Letters Patent.  Patented Dec. 17, 1918.

No Drawing.  Application filed May 8, 1918.  Serial No. 233,357.

*To all whom it may concern:*

Be it known that I, FREDERICK S. KNAPPER, a citizen of the United States, residing at Springfield, in the county of Clark, State of Ohio, have invented certain new and useful Improvements in the Composition of Matter for Use in Foundry Practice, of which the following is a description.

My invention relates to composition of matter for use in foundry practice and has for its object to produce a composition of matter suitable for use in making follow boards and patterns which will be capable of being molded to the form or shape desired while in plastic condition and when dried will retain the shape or form to which it has been molded and will be sufficiently strong to stand without breaking or change of form or shape repeated use under the jarring action of the molding machines.

With these and other objects hereinafter explained in view, my invention consists in the composition of matter hereinafter described and claimed.

The composition of matter of my invention is made up of sand, Portland cement, graphite or plumbago and litharge mixed together with linseed oil to form a plastic mass. I prefer to use the ingredients of my composition in the following proportions, about fifty parts sand preferably sharp sand such as that known as Cape Race, about three parts of Portland cement, about three parts of graphite or plumbago in powdered form, about one part of litharge and twelve to fifteen parts of linseed oil preferably boiled oil, sufficient oil being used to cause the composition to hold together in a plastic or semi-plastic mass.

The sand and other dry ingredients are first thoroughly mixed together and the oil then added and the whole worked over until the oil is thoroughly incorporated so that the mass is uniform throughout.

In the use of the composition above described for making up follow boards, it is rammed up and slicked to conform with the joint or parting of the pattern and is allowed to set and dry. In about an hour's time in any ordinary temperature the oil and litharge react to produce considerable heat, and when the heat dies away, the composition hardens in the form or shape given to it without expansion or contraction and when thoroughly hardened, which usually takes from three to six hours, it is ready for use.

The composition above described is also particularly adapted for making patterns. In making molds it is customary to use a pattern split in two and mount each part on a board, one part being used in the drag and the other in the cope, the two parts of the mold being put together for casting. This requires considerable skill and when it is impossible or undesirable to split the pattern it requires a great deal of skill to complete the two parts of the mold so that they can be brought together to make an accurate mold.

By the use of my composition, a pattern from which a casting is to be made may be embedded in a mass of my composition to the dividing line, if the pattern is not split and a half mold thus made against which one half mold may be rammed and then the other part of the pattern similarly treated and the other half of the mold rammed, thus producing the drag and cope without the exercise of the skill ordinarily required.

I have found in practice that by the use of my composition in this way molds may be made from patterns requiring flasks from 12 inches by 12 inches up to 36 inches, and I have found also that it is possible by the use of my composition in the manner indicated, to mount any and all patterns irrespective of size or shape without the aid of a second pattern.

The composition when in plastic condition is readily molded to take and retain the fine lines of a pattern and does not change its shape or form in setting and hardening.

Many other uses may be readily made of the composition whenever it is desirable to take and retain the shape or form of a pattern. Usually it is desirable to coat the mold or pattern formed from the composition with shellac. When so coated or even without such coating the mold or pattern formed of my composition will last for repeated use. I have used molds or patterns made of my composition at least five hundred times, and with reasonable care, there is no limit to the number of times such a mold or pattern may be used.

The above mentioned proportions of ingredients may be varied somewhat and raw linseed oil or other vegetable oil, may be used, but there is not the same heating with raw oil that takes place spontaneously with the boiled oil, and artificial heat is necessary.

Having thus described my invention, what I claim is:

1. A composition of matter for use in foundry practice consisting of sand, cement and graphite in proper proportions mixed with litharge and a vegetable oil to form a plastic mass, the litharge and oil being in such proportions as, by reaction, to produce a substantial heating of the mass.

2. A composition of matter for use in foundry practice consisting of sand, cement, graphite, litharge and a vegetable oil in the proportion of substantially 50 parts sand, 3 parts cement, 3 parts graphite, 1 part litharge and sufficient vegetable oil to form a plastic mass.

In testimony whereof I affix my signature this 22nd day of April, 1918.

FREDERICK SHIRLEY KNAPPER.

Copies of this patent may be obtained for five cents each, by addressing the "Commissioner of Patents, Washington, D. C."